United States Patent [19]

Palmer et al.

[11] 4,041,759
[45] Aug. 16, 1977

[54] ENVIRONMENTALLY-RESISTANT ANEMOMETER

[75] Inventors: Thomas Y. Palmer, Fallbrook; Clifford J. Auvil, Loma Linda, both of Calif.

[73] Assignee: The United States of America as represented by the Secretary of Agriculture, Washington, D.C.

[21] Appl. No.: 680,650

[22] Filed: Apr. 27, 1976

[51] Int. Cl.² .............................................. G01F 1/10
[52] U.S. Cl. .................................................. 73/231 R
[58] Field of Search ................... 73/170 A, 187, 189, 73/229, 231

[56] References Cited
U.S. PATENT DOCUMENTS

| | | | |
|---|---|---|---|
| 1,479,013 | 1/1924 | Sperry | 73/187 |
| 1,957,681 | 5/1934 | Thompson | 73/231 |
| 3,670,569 | 6/1972 | Partzsch | 73/187 |
| 3,756,079 | 9/1973 | November | 73/231 |
| 3,766,780 | 10/1973 | Aizawa et al. | 73/231 |
| 3,771,362 | 11/1973 | Roberts | 73/229 |

Primary Examiner—Herbert Goldstein
Attorney, Agent, or Firm—M. Howard Silverstein; David G. McConnell

[57] ABSTRACT

This invention relates to an improved helicoidal-bladed, cosine anemometer which is capable of accurately sensing very small elements of fluid flow at any angle of attack in hostile environments where extremes of temperature, dust, and moisture are encountered. This invention relies on principles of miniaturization which permit accurate measurement with a minimum of supporting equipment and which also permits thermal protection of the device in situations where temperature extremes are encountered. A notched lower end of the blade together with a plurality of parallel ridges around the circumference of the hub form a channel for deflecting air along the blade for the purpose of controlling the anemometer blade, tip, and edge vortices to eliminate dynamic pressures on adjacent blades which frequently occur in conventional bladed anemometers when the angle of fluid attack is large.

3 Claims, 7 Drawing Figures

SECTION A·A

SECTION B·B   SECTION C·C

ENVIRONMENTALLY-RESISTANT ANEMOMETER

BACKGROUND

1. Field of the Invention

This invention provides a bladed anemometer which has the capability of accurately sensing fluid flow under varying environmental conditions and varying angles of fluid attack. This invention, for the first time, permits sensing of fluid movements in hostile environmental conditions such as very high or very low temperature and high dust and moisture concentrations.

2. Prior Art

Anemometers utilizing a helicoidal blade design have been used for many years. This blade design was employed in air speed indicators of early aircraft because it had a superior response to side vectors. This design has also been used in previous fixed-blade anemometers such as the one built by Gill, et al. However, this instrument has shown an error, the magnitude of which varied with varying angles of fluid attack. The angle of attack is the angle between the anemometer axis and the fluid flow direction. Thus fluid flowing parallel to the direction of anemometer rotation would be termed to have an angle of attack of 90° while fluid flowing parallel to the shaft about which the blades rotate would have a 0° angle of attack. Additionally, the number of blades has been found to be a major factor affecting accuracy. In typical four-bladed anemometers, the error is approximately 10-20% at an angle of attack of 60°. For a three-bladed anemometer at an angle of attack of 80°, the error can be as much as 200%. With a given angle of attack, the total error has been found to depend on the number of blades and to a lesser extent the fluid speed.

The error associated with present anemometers has been attributed to the von Karman vortices shed by the shaft on which the anemometer is mounted. To counter these forces, various techniques such as roughening of the shaft and shaft extenders have been tried with little success. The failure of these corrective measures is due to the fact that these techniques did not attack the real source of the problem. Our research has shown that the sensing error of present anemometers results from vortices shed by the ends and edges of the anemometer blades as they move through the fluid.

Each blade of an anemometer acts as a miniature wing and, similarly to the wing of an aircraft, it has a tip vortex associated with it just as does an aircraft wing when producing lift forces. These lift forces become more important as the angle of fluid flow relative to the axis of the anemometer increases, and these forces vary in strength as the relative angle of attack of the blades changes during rotation. Each of the vortices interacts with all others in a complex manner but the general effect is to cause the vortices to rotate about each other with the axis of this vortex rotation spiraling away from the blades. Because of the interaction between the vortices, some of the vortices can be displaced so as to generate a change in the dynamic pressure on neighboring blades, and this pressure can be strong enough in some instances to reverse the direction of rotation or cause an increase in the speed of rotation.

No previous anemometer designs have been capable of continued operation in hostile environments such as where temperature, moisture or dust extremes exist. Thus in situations such as forest fires, remote installations at very high altitudes where low temperatures are reached or in areas where temperature extremes of both hot and cold were encountered, a practical method for continuously or regularly monitoring wind flow was nonexistent. The data derived from a forest fire situation would be useful in predicting the future course of the fire and planning countermeasures. In high altitude situations, such data might give important information as to the location and extent of snow accumulations thus facilitating road construction and maintenance planning. These are merely examples of situations in which accurate data on wind flow would be extremely valuable but which cannot be readily measured with existing equipment.

Thus one of the purposes of this invention is to eliminate the errors that have been associated with measurement of fluid velocity in previous devices.

Another purpose of this invention is to provide a means for measuring fluid velocity in rapidly varying, hostile environments.

A further purpose of this invention is to provide a device, the data from which may be easily and readily recorded, retrieved and analyzed.

Further purposes and features of this invention will become more apparent hereafter.

DESCRIPTION

In the following description, the terms fluid and wind will be used interchangeably to indicate that while other fluids than air can be measured with this device and are contemplated, air constitutes one of the primary fluids whose movement is frequently monitored.

Figure 1:
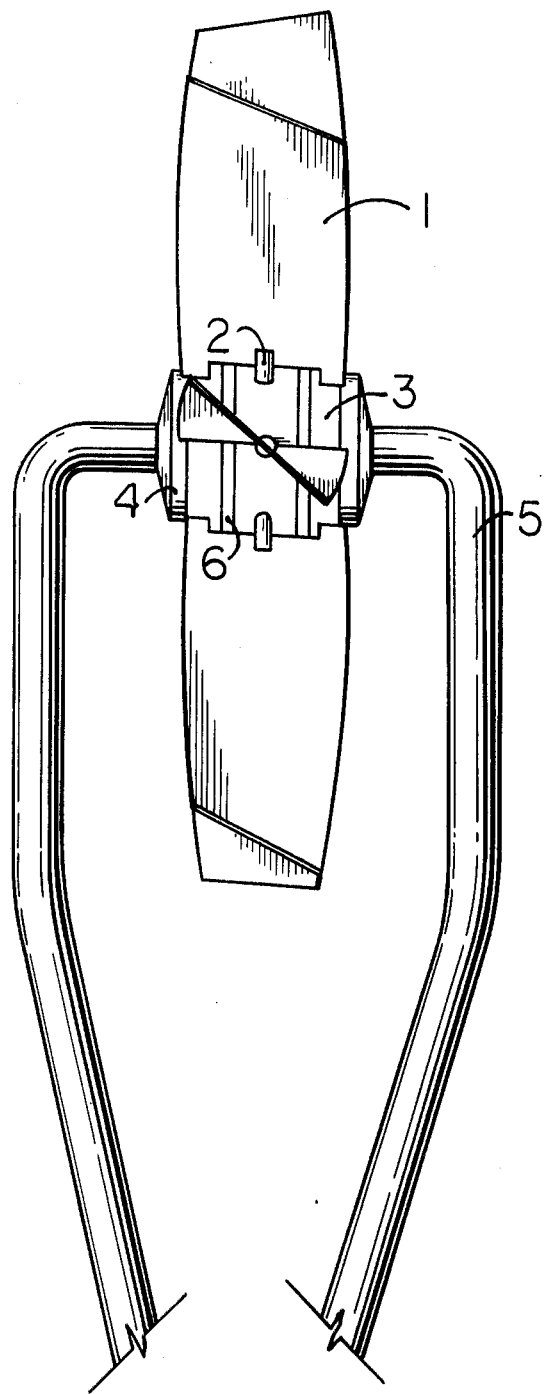
FIG. 1 is a view of the entire assembled anemometer.

FIG. 1 shows the entire assembled anemometer. The power source, data storage, and coolant handling systems are not shown but are attached to the base of the anemometer by insulated head wires (of proper length) for operation. In the ideal embodiment, eight helicoidal blades 1 are each attached at their lower, notched end to a stub 2 which stubs are inserted in evenly spaced holes around the circumference of the hub 3; however other numbers of blades may be used. The hub 3 is held between a pair of covers 4 which covers 4 fit over the internal shaft on which the hub is mounted and serve as a seal between the mounting tubes 5 and the hub 3.

One of the unique features of this anemometer is the channel created at the base of each blade 1, the flow of air in which channel is controlled by the two parallel, circular ridges 6 located on the exterior of the hub 3 perpendicular to the axis. The channel at the base of the blades 1 uses the dynamic pressure generated on the spherical surface of the hub 3 to control the vortex forces created by the blades 1. The semi-circular channel at the base of the blades 1 permits additional air to flow down the blades 1 and thus displace the blade-tip vortices farther away from the blades 1. This ducting effect causes air flowing at an angle to the axis of the instrument to be guided onto successive blades where it flows down the blade, deflecting the vortices away from the following blade, and thereby eliminating vortex interaction with the following blades. With the vortex effects significantly controlled, the helicoidal twist of the blades 1 becomes the dominant effect with the result that the anemometer blades 1 respond primarily to the variations of their angle of attack which response depends upon the cosine of the angle between the wind direction and the anemometer axis. Other specific methods of controlling blade vortex action are certainly possible while conforming to the concepts and principles described above.

Figure 2:
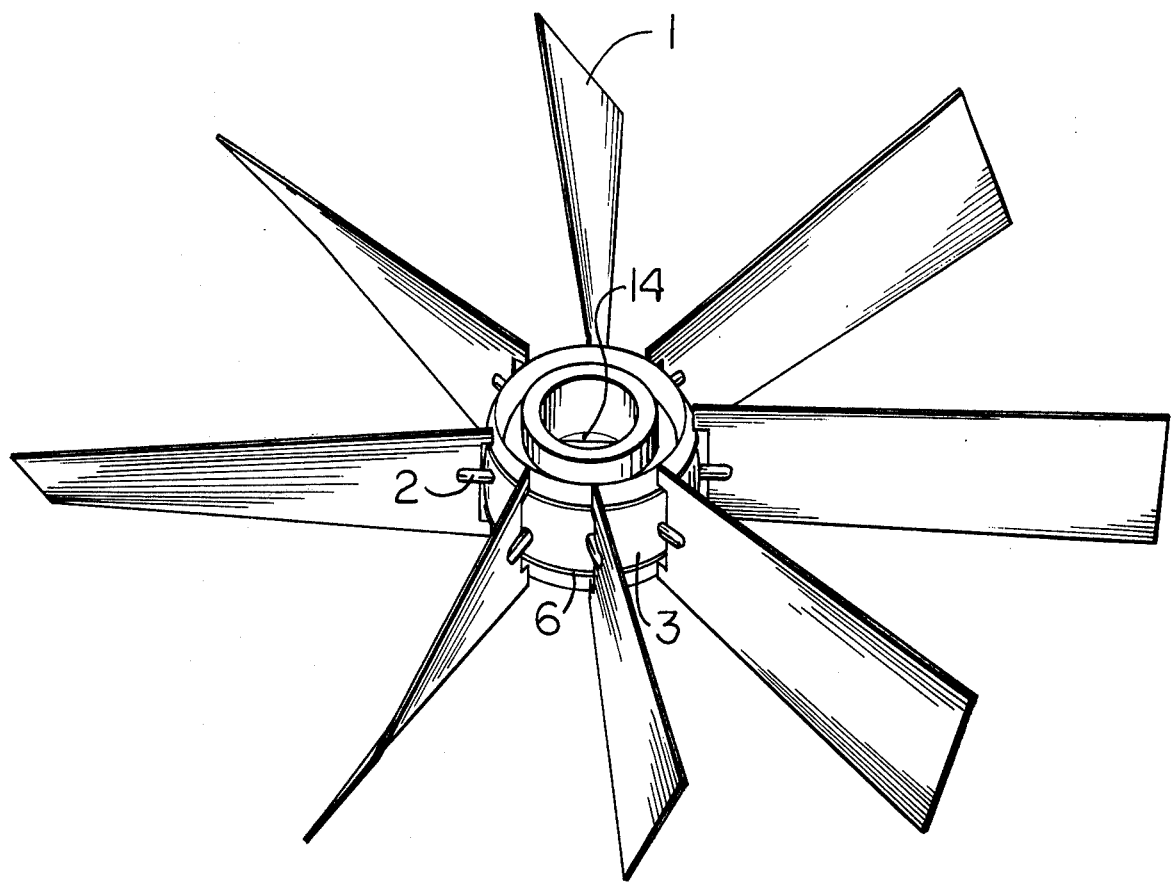
FIG. 2 is a view of the hub with attached blades which view illustrates the helicoidal twist of the blades.

FIG. 2 is a view of the hub 3 which shows the features of the attached blades 1. These helicoidal blades are formed by inserting a number (up to eight) of flat pieces of No. 305 stainless steel or equivalent 0.020 inch thick, 1.125 inches wide and 7.25 inches long between a pair of cold-rolled steel sections which serve as forms for the proper deformation of the blades. The sandwich is then placed in a lathe and twisted under tension for one 52° rotation which includes 8° of recovery for each 2.25 inches of blade length; a blade thus produced has the required helicoidal twist of 45° in 2.125 inches. The blade is then notched on one end and a stub 2 of the required length is attached to the blade.

Figure 3:
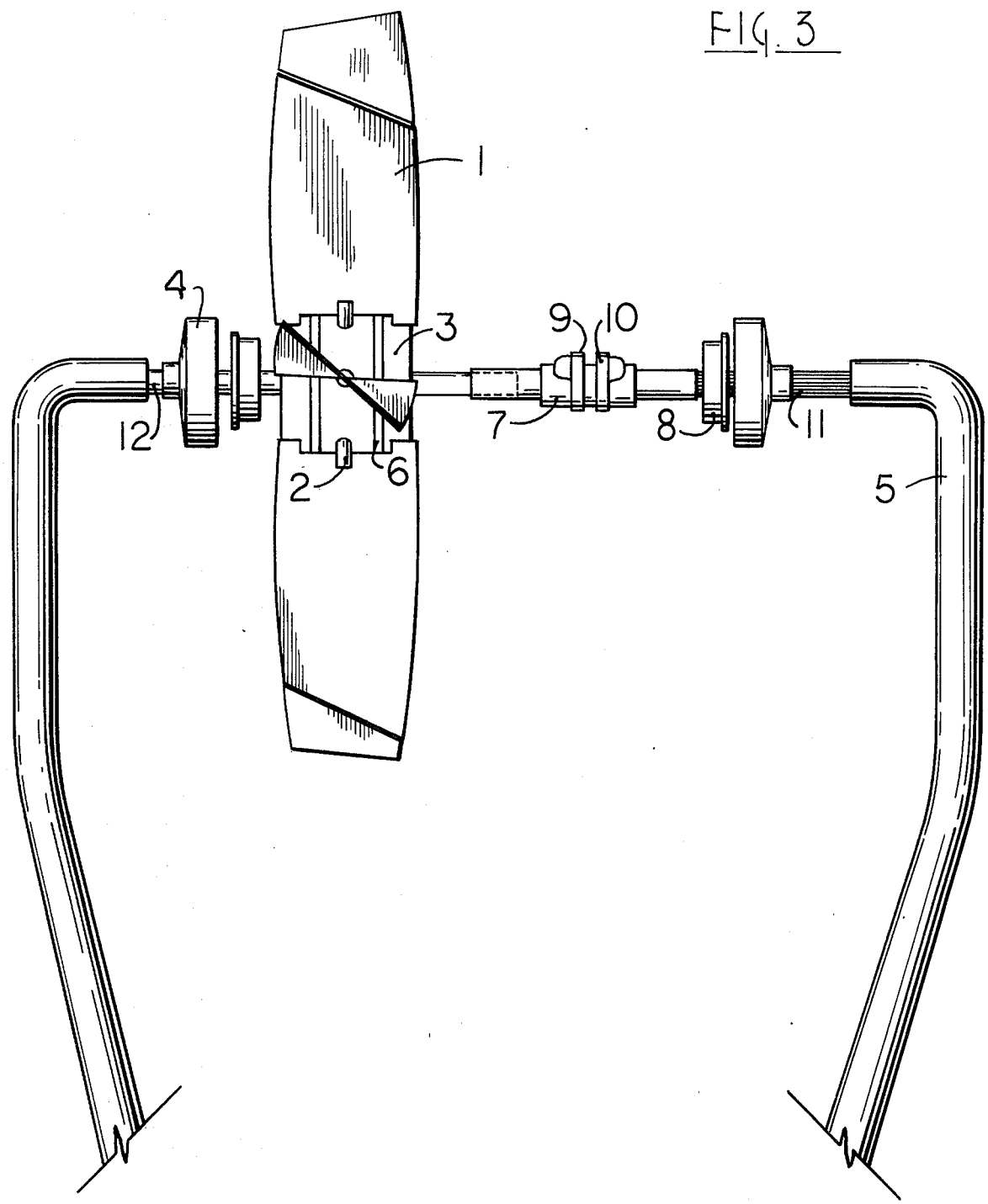
FIG. 3 is an exploded view of the anemometer showing all internal components.

FIG. 3 is an exploded view of the anemometer. The blades 1 are attached to the hub 3 by means of a stub 2. The hub 3 is mounted on a shaft 7 by means of instrument bearings 8 on each side in such a manner that the two shutters which are an integral part of the hub 3 on its interior pass between the two raised portions of the shaft 7. A cover 4 on either side of the hub 3 encloses the bearings 8 and covers each end of the shaft 7 as it fits into the mounting tubes 5. Mounted on the shaft and precisely spaced are a light-emitting diode (LED) 9 and a pair of photosensitive transistors 10 which are connected to the external power source and data measurement and recordation devices by heat resistant wiring 11 which extends through one of the mounting tubes 5. Through the other mounting tube, a smaller tube 12 conveys coolant or heated liquid or gas to the anemometer for temperature control of the device. Other methods of heating discussed below do not require use of the tube 12 and in those situations the tube 12 would not be used.

Figure 4:
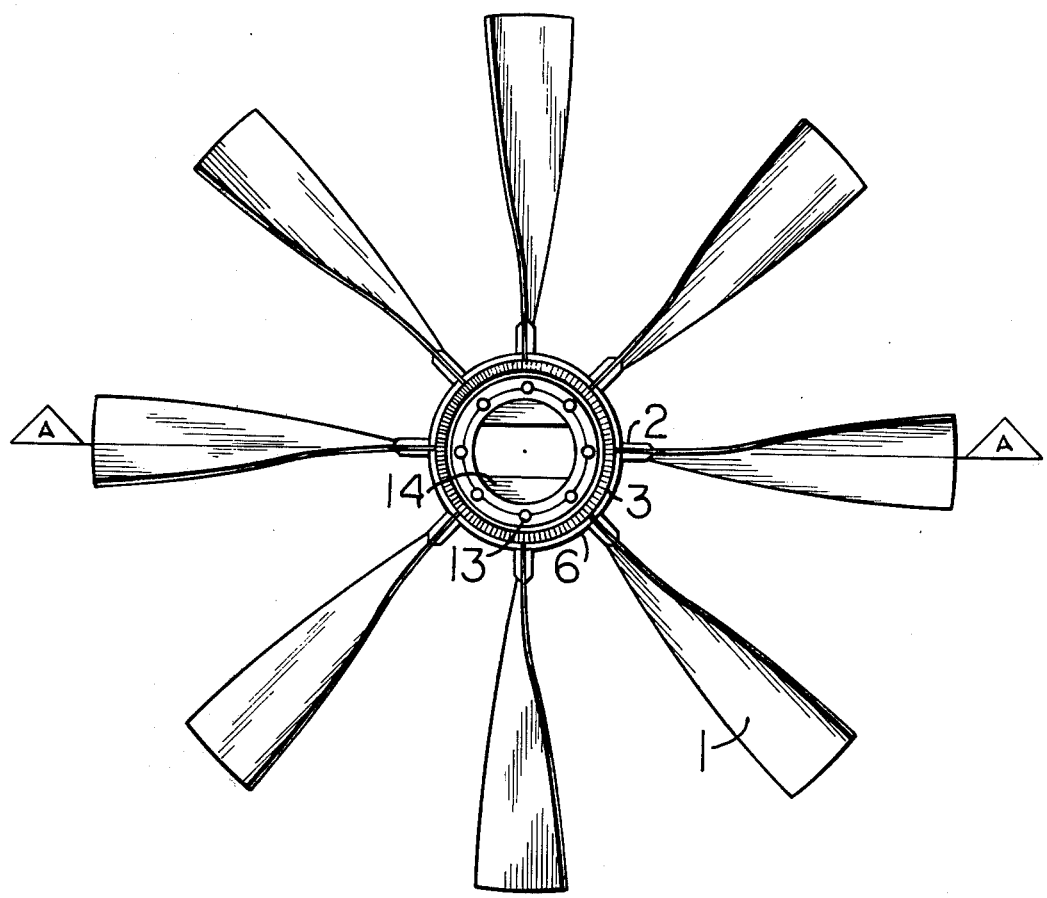
FIG. 4 is a side view of the hub with blades attached, this view showing the opposite side of the hub from that shown in FIG. 2; this view also contains the section line AA showing the place of section and line of sight of AA.

FIG. 4 is a side view of the hub 3 with blades 1 attached. Each stub 2 is inserted in a hole in the hub 3 and secured in place with a set screw 13. In the interior of the hub 3, two shutters 14 are sized and spaced so that when the device is assembled they permit the shaft to clear them while they periodically interrupt the light signal between the LED and the photosensitive transistors.

Figure 5:
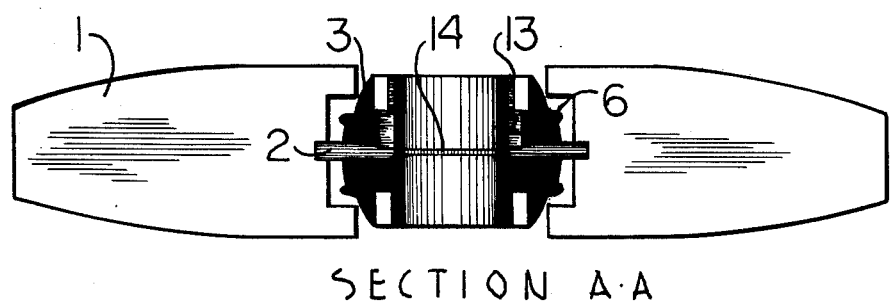
FIG. 5 shows section AA from FIG. 4 and is a sectional view of the hub assembly with blades attached.

FIG. 5 is a section view of the hub 3 as indicated by section line AA in FIG. 4. FIG. 5 clearly shows the spherical shape of the hub 3 with the channel created by the blades 1 and ridges 6. This figure also shows the manner in which the stubs 2 are held in place by the set screws 13 as well as the position and relative thickness of one of the shutters 14.

Figure 6:
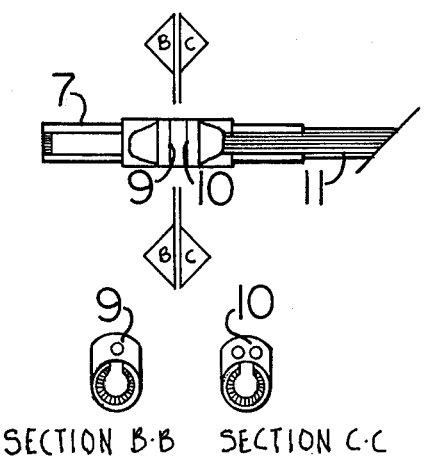
FIG. 6 is a view of the anemometer shaft assembly with sections BB and CC as indicated.

FIG. 6 is a top view of the shaft with sectional views BB and CC as indicated. The shaft 7 is a semi-cylindrical piece with the upper side open. In the center of the shaft 7 are mounted the LED 9 and the photosensitive transistors 10. As shown in section view BB, the LED 9 is centrally mounted while section view CC shows that the two photosensitive transistors 10 are offset from center with one on either side of the center and the distance between precisely known. The shaft 7 is beveled to a thinner wall thickness on either end. On the right side the wiring to operate the sensors is placed and on the left side the tube conveying coolant or heated fluid joins the shaft 7. The open upper wall of the shaft 7 creates an expansion area where the cooling or heating fluid can expand to cool or heat all interior portions of the anemometer.

Figure 7:
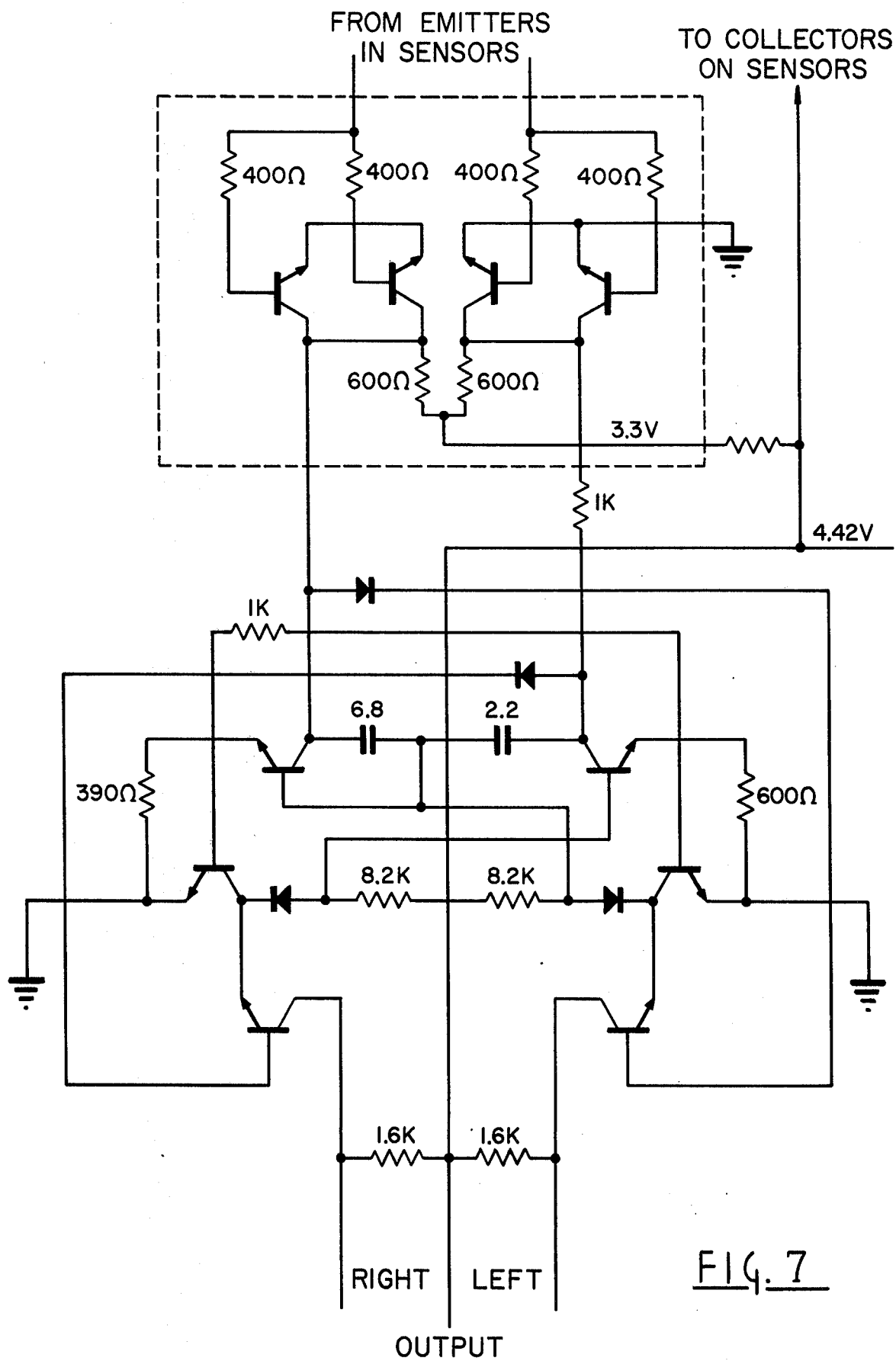
FIG. 7 is a schematic of one of the available methods of transforming the anemometer output to readily recordable and usable form.

FIG. 7 is a schematic representation of one of the methods by which the signals from the anemometer sensors are transformed to a digitized form for recording. Input from the two photosensitive transistors is amplified, analyzed for direction of rotation and then converted into pulses proportional to the speed of rotation.

In operation several methods of timing rotation speed may be employed and the following two methods are merely illustrative. In any method the first operation is the discrimination of the direction of rotation. This is accomplished in the discriminator circuit as exemplified by the upper block in FIG. 7. In the first method the LED signal is constant, but as the hub rotates the shutters successively interrupt the signal between the LED and the photosensitive transistors (sensors). The sensors are precisely spaced so that time-on and time-off are functions of the rotation rate. Since the LED has a rapid response to applied electrical signals, a sinusoidal or square wave with precisely controlled frequency between 1 and 10 kilohertz can be used to modulate the light intensity. The self-contained time signal of this modulated light beam is chopped or interrupted at a much lower rate (a maximum of 100 hertz) by the shutters. With a known control frequency, accurate timing of the interval that light is transmitted is possible without resort to any other timing device anywhere in the circuitry. This information is translated into a known angle per unit time, and after calibration in a wind tunnel, a reading of wind speed can be obtained. The information derived from the device is in the form of pulses and can be readily recorded on inexpensive recording equipment since the accuracy of the information is completely independent of tape recorder wow, flutter, and other variations. The extremely fast response time of the components used in this device allow measurements of response lengths of less than 2 feet.

A second method involves introducing a sinusoidal or square wave signal at the phototransistors and using the shutter-interrupted LED signal to turn them on and off, thereby admitting a signal to a counter. Utilization of this method of timing allows the use of different frequencies which may be passed through filters to indicate direction of rotation as well as speed of rotation. As in the first method this information can be directly placed on economical recorders. As noted earlier these are merely two available methods for utilizing the internal timing principle of this invention.

When operating in an environment with extremely high temperatures, Freon-21 or equivalent is forced through the cooling tube and expands in the expansion area of the shaft and hub thus cooling the sensing components to the boiling point of the coolant (51° F for Freon-21). The exhaust gas is then passed down the mounting tubes, cooling the heat-resistant wiring within the tube, and then is exhausted to the atmosphere. A single half-pound charge of Freon-21, using the pressure in the charge to move the coolant, has been found to last approximately 30 minutes and permits continuous operation at temperatures of as much as 2500° F. This system has been used successfully in forest fires where temperatures exceeded 2100° F. Additionally, these devices have been successfully used in isolated areas with temperature variations from −40° to 120° F and wind speeds from 0 to 140 miles per hour. The device would operate similarly in extreme cold except resistance-wire heating or some other method of heating could be used. The miniaturization of sensing components greatly decreases the amount of environmental isolation required and permits simple protection against moisture, dust, and temperature extremes.

This invention has significant advantages over previous anemometers in several respects. First, the error inherent in previous devices when subjected to fluid flow at an angle to the axis of the anemometer is eliminated by use of the unique channelized flow concept which forces the vortices, which caused the error, away from other blades. Second, the use of miniaturized electronic circuits permits the internal timing of the rotation rate with no other timing device or system necessary. Because all timing is handled internally, inexpensive recording equipment may be used without affecting the accuracy of the data due to variations in the recording equipment. Finally, this miniaturization permits the ready and simple isolation of vital components from moisture, dust and temperature extremes, thus allowing use under severe environmental conditions. In all of the above respects, this device is unique from and superior to present devices.

Having thus described our invention, we claim:

1. A cosine anemometer for measuring fluid velocity, which anemometer is composed of a plurality of helicoidal blades attached to a hub, the lower, notched end of said blades together with a plurality of parallel ridges around the circumference of said hub form a channel for deflecting air along said blades for the purpose of eliminating blade-created vortex interference with other blades, said hub rotatably mounted on a suitably supported shaft, which shaft and said hub contain devices to sense the rotational speed of said hub, which sensing devices are connected to appropriate recordation devices.

2. A cosine anemometer for measuring fluid velocity, which anemometer is composed of a plurality of helicoidal blades attached to a hub, the lower, notched end of which blades together with a plurality of parallel ridges around the circumference of said hub form a channel for deflecting air along said blades for the purpose of eliminating blade-created vortex interference with other blades, which hub is rotatably mounted on a suitably supported cylindrical shaft, on which shaft in parallel configuration are mounted a miniaturized electronic signal-source and a plurality of miniaturized electronic signal-sensors, which signal-source and signal-sensors, when connected with other appropriate electrical devices, respectively transmit and receive a time-related signal, which signal is intermittently and regularly interrupted by a plurality of shutters in the interior of said hub, which interruption is related to the rotational speed of the hub, and which series of interrupted signals are processed in an appropriate electrical circuit, the output from which circuit is a record of fluid speed, which record is then recorded on appropriate recordation devices.

3. An environmentally-resistant cosine anemometer for measuring fluid velocity, which anemometer is composed of a plurality of helicoidal blades attached to a hub, the lower, notched end of said blades together with a plurality of parallel ridges around the circumference of said hub form a channel for deflecting air along said blades for the purpose of eliminating blade-created vortex interference with other blades, said hub rotatably mounted on a suitably supported hollow semi-cylindrical shaft, the open circumference portion of said shaft acts as an expansion area for coolant or other thermal control medium for the purpose of maintaining an acceptable internal operating environment regardless of the external environment in which the anemometer is placed, which thermal control medium is conducted to said shaft by suitable means through the mounts by which said shaft is supported, on which shaft in parallel configuration are mounted a miniaturized electronic signal-source and a plurality of miniaturized electronic signal-sensors, which signal-source and signal-sensors, when connected with other appropriate electrical devices, respectively transmit and receive a time-related signal, which signal is intermittently and regularly interrupted by a plurality of shutters in the interior of said hub, and which series of interrupted signals are processed in an appropriate electrical circuit, the output from which circuit is a record of wind speed, which record is then recorded on appropriate recordation devices.

* * * * *